(12) United States Patent
Bovero et al.

(10) Patent No.: US 11,634,593 B2
(45) Date of Patent: Apr. 25, 2023

(54) METHOD FOR FABRICATING A HYDROPHOBIC COATING FOR CORROSION PROTECTION

(71) Applicant: Saudi Arabian Oil Company, Dhahran (SA)

(72) Inventors: Enrico Bovero, Reggio Emilia (IT); Gasan Selman Alabedi, Gatley (GB); Aziz Fihri, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 166 days.

(21) Appl. No.: 16/724,969

(22) Filed: Dec. 23, 2019

(65) Prior Publication Data

US 2020/0140697 A1 May 7, 2020

Related U.S. Application Data

(62) Division of application No. 15/641,513, filed on Jul. 5, 2017, now abandoned.

(51) Int. Cl.
*C09D 5/08* (2006.01)
*C08K 3/36* (2006.01)
(Continued)

(52) U.S. Cl.
CPC .............. *C09D 5/084* (2013.01); *B05D 5/08* (2013.01); *B05D 7/54* (2013.01); *C08K 3/36* (2013.01);
(Continued)

(58) Field of Classification Search
CPC .................................. C09D 7/61; C09D 7/67
See application file for complete search history.

(56) References Cited

U.S. PATENT DOCUMENTS 5,061,286 A * 10/1991 Lyle .................... A61F 2/30767
623/23.63
6,024,824 A * 2/2000 Krech ................ B24D 18/0054
156/303.1
(Continued)

FOREIGN PATENT DOCUMENTS

CN 101448591 A 6/2009
CN 103080377 A 5/2013
(Continued)

OTHER PUBLICATIONS

Chujiang Cai, et al. "Superhydrophobic Surface Fabricated by Spraying Hydrophobic R974 Nanoparticles and the Drag Reduction in Water," Surface & Coatings Technology 307 (2016).
(Continued)

*Primary Examiner* — Robert A Vetere
(74) *Attorney, Agent, or Firm* — Leason Ellis LLP (57) ABSTRACT

A method of fabricating a hydrophobic coating on a surface of a solid substrate which includes a layer-integrable material includes the steps of depositing a deformable layer of the layer-integrable material onto the surface of the solid substrate, forcibly embedding a plurality of particles within the deformable layer, and solidifying the deformable layer including the plurality of particles so as to be integral with the surface of the solid substrate. At least a portion of the plurality of particles is embedded at a threshold depth within the deformable layer prior to solidification.

10 Claims, 5 Drawing Sheets

(51) Int. Cl.
*C09D 163/00* (2006.01)
*C09D 7/40* (2018.01)
*C09D 7/61* (2018.01)
*C09D 5/16* (2006.01)
*B05D 7/00* (2006.01)
*B05D 5/08* (2006.01)

(52) U.S. Cl.
CPC ............ *C09D 5/08* (2013.01); *C09D 5/1681* (2013.01); *C09D 7/61* (2018.01); *C09D 7/67* (2018.01); *C09D 163/00* (2013.01); *B05D 2451/00* (2013.01); *C08K 2201/005* (2013.01); *C08K 2201/011* (2013.01)

(56) References Cited

U.S. PATENT DOCUMENTS

| | | | |
|---|---|---|---|
| 8,784,713 | B2 | 7/2014 | Victor et al. |
| 9,056,987 | B2 | 6/2015 | Sunder et al. |
| 2007/0112101 | A1 | 5/2007 | Choi et al. |
| 2007/0141114 | A1 | 6/2007 | Muisener et al. |
| 2008/0305341 | A1 | 12/2008 | Plieth et al. |
| 2009/0011222 | A1* | 1/2009 | Xiu .................. C23C 18/00 428/323 |
| 2011/0134309 | A1 | 6/2011 | Hsieh et al. |
| 2011/0143094 | A1* | 6/2011 | Kitada ................. B32B 33/00 428/143 |
| 2011/0281070 | A1 | 11/2011 | Mittal et al. |
| 2011/0287203 | A1 | 11/2011 | Choi et al. |
| 2014/0162022 | A1* | 6/2014 | Nowak ............... C09D 175/04 428/145 |
| 2017/0204279 | A1 | 7/2017 | Larimer et al. |

FOREIGN PATENT DOCUMENTS

| | | |
|---|---|---|
| CN | 103587185 A | 2/2014 |
| CN | 103937318 A | 7/2014 |
| CN | 106883650 A | 6/2017 |
| WO | 2014035742 A2 | 3/2014 |
| WO | 2015078099 A1 | 6/2015 |

OTHER PUBLICATIONS

Wael I. El Dessouky et al. "Improved Adhesion of Superhydrophobic Layer on Metal Surfaces via One Step Spraying Method," Arabian Journal of Chemistry 10 (2017).
International Search Report and Written Opinion in Corresponding PCT Application No. PCT/US18/40912 dated Sep. 21, 2018. 107 pages.
International Preliminary Report on Patentability in Corresponding PCT Application No. PCT/US18/40912 dated Jul. 9, 2019. 11 pages.
Chinese Office Action in Corresponding Chinese Patent Application No. 201880045039.1 dated Mar. 23, 2021. 9 pages.

* cited by examiner

METHOD FOR FABRICATING A HYDROPHOBIC COATING FOR CORROSION PROTECTION

CROSS-REFERENCE TO PRIOR APPLICATION

This application is a division of, and claims priority from, U.S. patent application Ser. No. 15/641,513, titled HYDROPHOBIC COATING FOR CORROSION PROTECTION AND METHOD OF FABRICATION, filed Jul. 5, 2017, which is hereby incorporated by reference in its entirety.

FIELD OF THE INVENTION

The present invention relates to a coating system used for corrosion protection, and, in particular, relates to a method for fabricating a hydrophobic coating system that is resistant to corrosion.

BACKGROUND OF THE INVENTION

Figure 1:
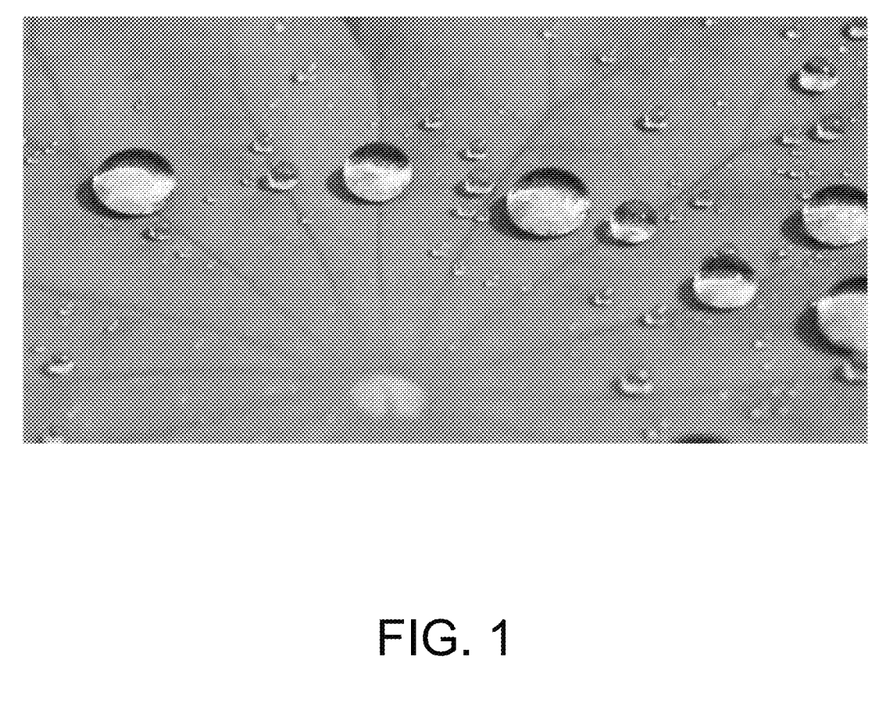
FIG. 1 is perspective view showing droplets of water on a Lotus leaf, illustrating the Lotus effect (ultra-hydrophobicity).

In a number of industries, extensive infrastructure is installed in harsh environments. Prolonged exposure to weathering conditions in such environment can cause structural degradation. For example, platforms and pipes used in the oil industry in marine environments are subject to prolonged exposure to infiltration by salt water, which cause the surfaces of these structures to corrode and degrade. In marine environments in particular, attempts have been made to protect surfaces against corrosion by increasing the water resistance (hydrophobicity) of the surfaces via the "Lotus effect." The "Lotus effect" refers to the self-cleaning properties of the leaves of the Lotus flower. The leaves of the Lotus flower contain a microscopic protrusion/wax double layer that is highly hydrophobic. As illustrated in FIG. 1, the high surface tension of water on the Lotus leaves causes droplets to form a nearly spherical shape with a high contact angle.

Attempts have been made to simulate the Lotus effect on surface coatings using different approaches. One approach involves formation of a specific morphology on a structural surface, typically on the microscopic or nanoscopic scale. This approach suffers from difficulties and inefficiencies in forming the morphology in situ with nano-fabrication procedures or molds. Accordingly, this approach is difficult to apply economically on a large scale. A second approach involves adding a layer of particles to a structural surface in order to provide surface roughness and optional hierarchical structure. A significant disadvantage of the second approach is the general lack of adhesion of the additives. While these particle additives can be generally applied to a wide variety of surfaces and materials with outstanding results, their adhesion to the underlying substrate is usually not strong enough to provide protection for longer than a relatively short duration, e.g., several months.

There is accordingly a need for improved and cost-effective techniques for providing anti-corrosive hydrophobic structural coatings.

SUMMARY OF THE INVENTION

Embodiments of the present invention provide a method of fabricating a hydrophobic coating on a surface of a solid substrate that includes a layer-integrable material. The method includes depositing a deformable layer of the layer-integrable material onto the surface of the solid substrate, forcibly embedding a plurality of particles within the deformable layer, and solidifying the deformable layer including the plurality of particles so as to be integral with the surface of the solid substrate. At least a portion of the plurality of particles is embedded at a threshold depth within the deformable layer prior to solidification.

In some embodiments, the step of forcibly embedding a plurality of particulates within the deformable layer includes bombarding the deformable layer with a stream of particulates at selected momenta. In various implementation of the fabrication method according to the present invention, each of the plurality of particles has a size in a range of 1 nm to 50 µm. In some implementations, each of the plurality of particles has a size in the range of 5 nm to 50 nm. In some embodiments, the distribution of sizes of the plurality of particles can range between 1 and 50 percent from an average size value. In other embodiments, the plurality of particles has a multimodal size distribution.

The deformable layer can be deposited in a fluid, semi-viscous or viscous form and can comprise an epoxy resin. In some implementations, the plurality of particles is composed of silica. In an advantageous embodiment, upon solidification of the deformable layer, the plurality of particles have a hierarchical morphology such that a portion of the plurality of particles are exposed on a surface of the solidified deformable layer, and a portion of the plurality of particles are fully embedded within the solidified deformable layer.

Embodiments of the present invention also provide a hydrophobic coating that comprises a matrix of layer-integrable material and a plurality of particles embedded at varying depths within the matrix of layer-integrable material, wherein the plurality of particles have a size in a range of 1 nm to 50 µm.

In some embodiments, the matrix of layer-integrable material comprises an epoxy resin. The plurality of particles can be composed of silica. In some implementations, the hydrophobic the plurality of particles has a size distribution ranging between 1 and 50 percent from an average size value of the plurality of particles. In other implementations, the plurality of particles has a multimodal size distribution.

These and other aspects, features, and advantages can be appreciated from the following description of certain embodiments of the invention and the accompanying drawing figures and claims.

BRIEF DESCRIPTION OF THE DRAWINGS

It is noted that the drawings are illustrative and not necessarily to scale.

DETAILED DESCRIPTION CERTAIN OF EMBODIMENTS OF THE INVENTION

By way of overview, methods for fabricating a hydrophobic coating are disclosed herein which are suitable, among other purposes, for protecting structures from corrosion and degradation in harsh environments. Certain materials, such as epoxy resins have the useful property that integral structures can be generated by sequentially depositing and solidifying fluid or semi-fluid layers onto one another; chemical bonding (e.g., cross-linking of polymer chains, polymerization, crystallization) occurs between the layers and builds up a solid, continuous matrix. The term "integral" here indicates that there is no discontinuity between the deposited layers of the material upon their solidification and the individual layers become integrated into the substrate. More specifically, bonding and/or cross-linking takes place across the boundaries of the deposited layers and this bonding is of the same type as that which occurs within the layers and/or substrate itself, providing additional strength to the resulting structure. Within this disclosure the term "layer-integrable material" or "LIM" is a term used to denote materials having this property. Such LIM materials are useful for fabricating corrosion-resistant coatings.

In one or more embodiments, a method of fabricating a hydrophobic coating on a surface of a solid substrate composed of or including a layer-integrable material comprises depositing a deformable layer of the same layer-integrable material onto the surface of the solid substrate, then forcibly embedding a plurality of particles within the deformable layer, and solidifying the deformable layer including the plurality of particles so as to be integral with the surface of the solid substrate, wherein at least a portion of the plurality of particles is embedded at a threshold depth within the deformable layer prior to solidification.

Figure 2:
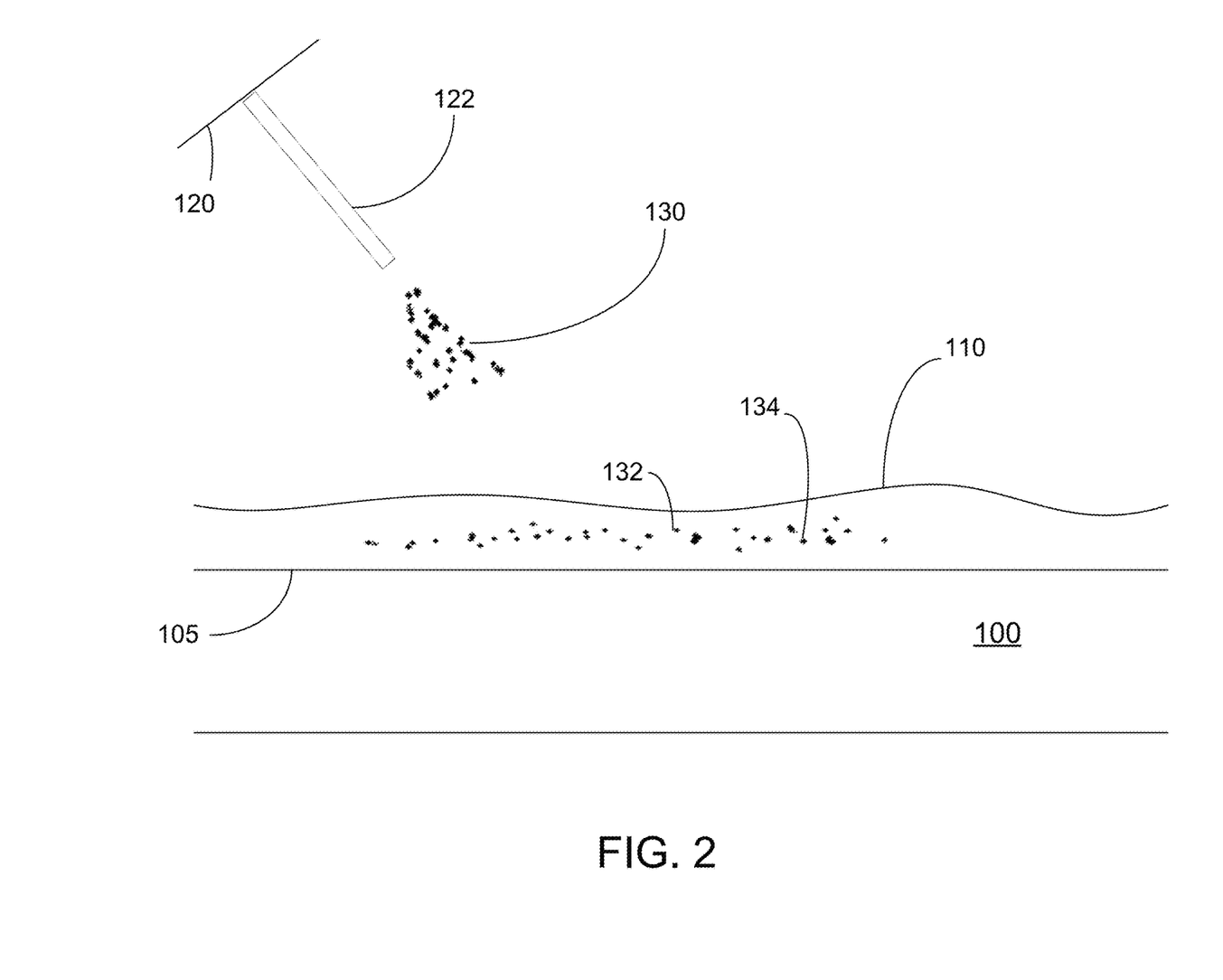
FIG. 2 is a schematic illustration of a method of fabricating a hydrophobic coating according to an embodiment of the present invention.

FIG. 2 is a schematic block diagram that illustrates an embodiment of the fabrication method according to the present invention. In FIG. 2, a substrate 100, which may be a wall of a pipe, vessel or other structure, is shown. The external surface of the substrate 105, which is exposed to the environment, is composed of a layer-integrable material, for example, an epoxy resin. Suitable epoxy resins include bisphenol, aliphatic, novolac and glycidylamine epoxy resins. Suitable curing agents that can be included in the epoxy resins include amines, thiols, anhydrides and phenols, and homo-polymerization improves hardening. A deformable layer 110 of the same layer-integrable material, such as an epoxy resin, is positioned on the surface 105 of the substrate. The deformable layer 110 is deposited on the surface 105 in a viscous or semi-viscous form. A spray gun or similar particle-bombardment device 120 ("bombardment device") having a nozzle 122 directed toward the deformable layer is shown projecting particles toward the deformable layer 110. The bombardment device can be pneumatically or electrostatically operated, or can be operated based on any other suitable energy source.

The particles 125 that are projected from bombardment device 125 are microscopic and/or nanoscopic in scale. That is the largest dimension (e.g., diameter) of the particles 125 can be in the range of about 1 nm to about 50 µm, and is preferably in the range of about 5 to about 50 nanometers, although other particle dimensions can be employed. The purpose of the particles is to impart surface roughness to the deformable layer and impart hydrophobic properties in the manner of the Lotus effect. The particle size is selected carefully both to ensure that the surface does not become overly fragile (when the particles are too small), and that the contact area between the surface and the droplets does not becomes too large, which can reduce the Lotus effect. Thus, the particle size is selected to maximize the Lotus effect by avoiding undesirable gaps to form and to keep the surface area between the particles and droplets in an optimal range.

The distributions of sizes within a set of particles selected for bombardment can also be varied to affect the resulting morphology of the coating. In some implementations, the distribution can be unimodal, with a central average, and variance of sizes ranging from 1 to 50% about the average size. In other implementations, the distribution can be multimodal (e.g., 2 to 5 distinct size distributions) with each distinct range having its own modal average and a narrower variance, e.g., 1 to 10 percent from each modal average. Other numbers of modes and distributional variances can be used. The selection of size distributions provides any way to adjust the hydrophobicity of the surface because the roughness of the surface typically decreases with the number of distinct size distributions, which can reduce hydrophobicity.

Figure 3A:
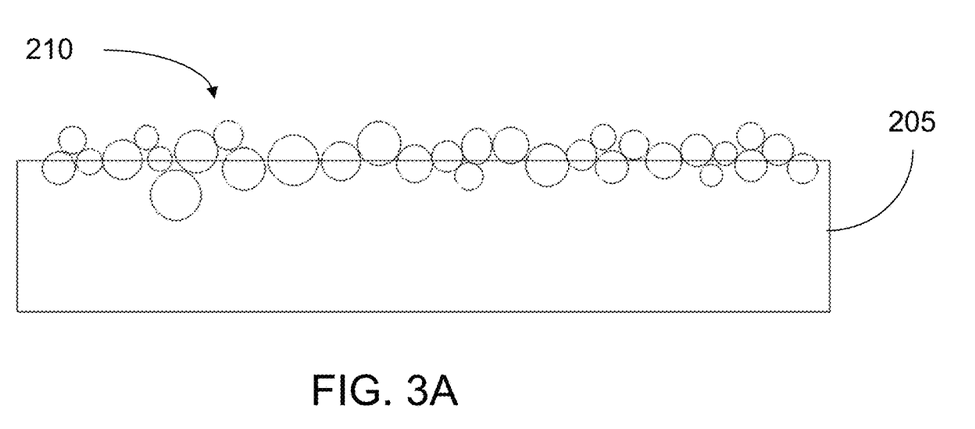
FIG. 3A is a schematic illustration depicting an exemplary deformable layer in which a unimodal distribution of particles have been embedded according to an embodiment of the present invention. A wide size distribution is depicted.
Figure 3B:
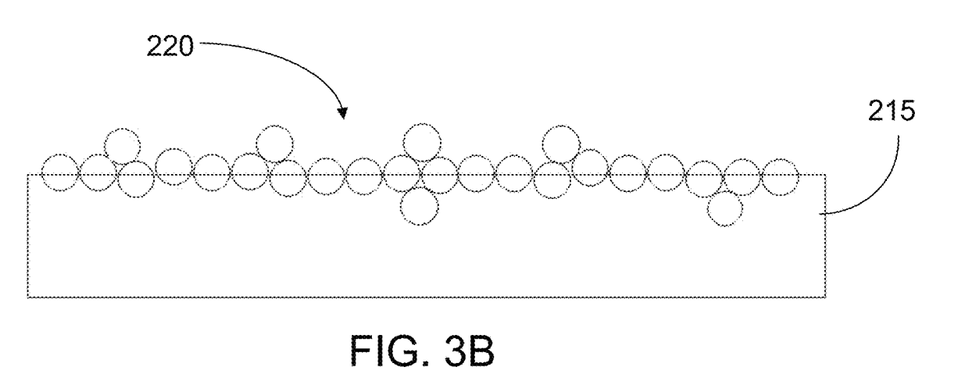
FIG. 3B is a schematic illustration depicting an exemplary deformable layer in which another unimodal distribution of particles have been embedded according to an embodiment of the present invention. A narrow size distribution is depicted.
Figure 3C:
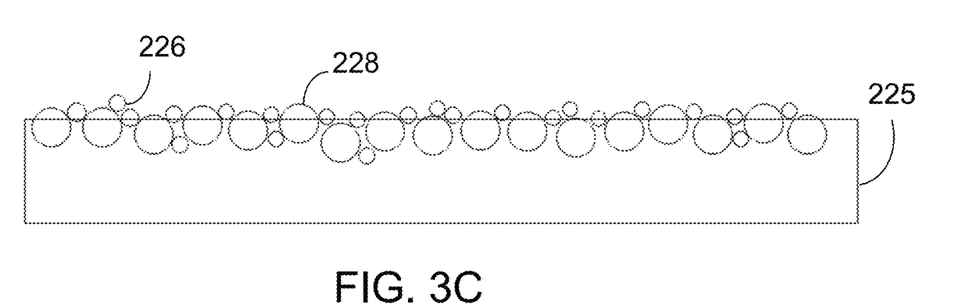
FIG. 3C is a schematic illustration depicting an exemplary deformable layer in which a bimodal distribution of particles have been embedded according to an embodiment of the present invention.

However, one of the advantages of multimodal size distributions is that it allows a hierarchical structure to be created having enhanced hydrophobicity. FIG. 3A schematically illustrates deformable layer 205 in which a unimodal distribution of particles 210 have been embedded according to an embodiment of the present invention. The distribution of particles 210 varies approximately 50% about an average (i.e., if the average is normalized at 1.0, the size of the particles varies from 0.5 to 1.5. FIG. 3B illustrates another embodiment, depicting a deformable layer 215 in which a different unimodal distribution of particles 220 has been embedded. In FIG. 3B, the unimodal distribution is more narrow, in that the size of the particles vary only about 10 percent from the average (i.e., if the average is normalized at 1.0, the size of the particles varies from 0.9 to 1.1). FIG. 3C illustrates a further embodiment, depicting a deformable layer 225 in which a bimodal distribution of particles, 226, 228 has been embedded. The first distribution of particles 226 has an average diameter less than half of the average diameter of the second distribution of particles 228. Each distribution 226, 228 in the embodiment shown in FIG. 3C various about 10 percent from the average. FIG. 3C illustrates a hierarchical surface structure that can be created using a multimodal particle size distribution. It is noted that while the particles are depicted as circles in FIGS. 3A-3C, this is for purposes of convenient illustration only, and does necessarily represent the shape of the particles, which can be irregular.

The adhesion of the particles within the deformable layer is selected such that a portion of the particles emitted by the bombardment device penetrate to a threshold depth within the deformable layer. The threshold depth can range from one-quarter of the average diameter of the particles to approximately 100 times the average particle diameter. This depth range can provide a complex morphology with particles distributed throughout the depth of the deformable layer. This is achieved by adjusting both the viscosity of the deformable layer and the momentum of the particles emitted by the bombardment device. With regard to the first factor, the material of the deformable layer is adjusted to provide sufficient fluidity for at least a portion of the particles to reach the threshold depth. The viscosity is also adjusted to be sufficient high to avoid having completely the particles penetrate completely through the deformable layer to the surface of the substrate. Thus, the factors are adjusted so that a significant portion of the particles are exposed on the surface of the deformable layer so as to provide surface roughness. A suitable range for the viscosities of the deformable layer is between about 1000 and about 500,000 cP, although other viscosity levels can be used. Such viscosities enable particles of micro to nanometer-size to penetrate into the matrix of the deformable layer without penetrating through to the substrate. In addition temperature conditions are adjusted, according to the type of material used, to ensure that the viscosity of the deformable layer is maintained within a suitable range.

With regard to the particle bombardment, the momentum of impact and the size of the particles are taken into account. In particular, for the same speed of impact, and the same mass, particles with smaller diameters tend to penetrate deeper than particles with larger diameters. Similarly, keeping the bombardment speed and size constant, heavier particles tend to penetrate further than lighter ones. As a result, the viscosity of the deformable layer is adjusted in tandem with particle bombardment parameters to enable at least a portion of the particles to penetrate to the desired depth. As a rule of thumb, the viscosity is estimated to be directly proportional to the momentum of the particles and inversely proportional to the area of impact. This relationship can be summarized by the following equation:

$$V = k \cdot \frac{p}{a} \qquad (1)$$

in which V is the viscosity, p is the momentum of the particles, a is the area of impact, which is directly related to the size of the particles, and k is a constant.

In some implementations of the present invention, epoxy resin is used as the matrix for the deformable layer and silica is used as the material for the particles (referred to as the Epoxy/Silica system). Commercial Epoxy resins can be prepared by mixing pre-polymer and a curing agent. The resins can then be applied on the structure in fluid form using techniques known in the art. Generally, directly after preparation, the viscosities of such epoxy resins are in the range of about 1000 to about 3000 cP, and within a half hour of application to a structure, the viscosities can reach a range of about 10,000 to about 50,000 cP. This range is suitable for the bombardment with silica nanoparticles according to the present invention. In one specific implementation, a bimodal distribution of particles sizes is used, with a first distribution having sizes ranging from about 200 to about 800 nm, and a second distribution with smaller particles ranging from about 10 to about 100 nm. The speed of bombardment in these conditions is on the order of the speed of simple casting and can range from 0.1 m/s to 10 m/s according to the desired ultimate depth of the particles within the deformable layer.

Once the nanoparticles have been embedded into the coating the deformable layer can be cured and solidified. Due to the fact that particles are bombarded to penetrate at various depths, upon solidification, a hierarchical morphology is thus frozen in place. The hierarchical morphology gives the coatings fabricated according to the present invention a significant advantage in that the coating can retain hydrophobicity and surface roughness even after a certain amount of corrosion and surface wear. This is because as the exposed layers of the particles on the surface are worn away, the particles embedded beneath are in turn exposed to the surface, and provide a commensurate level of surface roughness and hydrophobicity to the coating.

Figure 4:
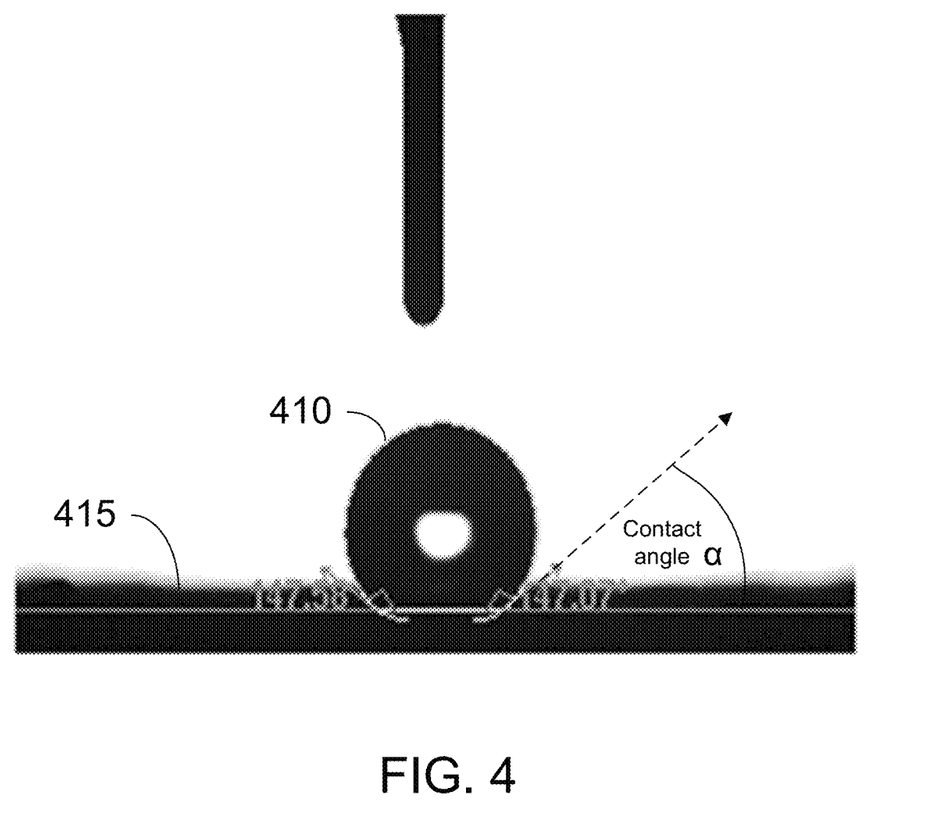
FIG. 4 is a schematic illustration of test for measuring a contact angle between a water droplet and a coating according to the present invention.

Coatings fabricated according to the present invention can achieve a contact angle (the angle ($\alpha$) at which a water droplet contacts a surface) averaging as high as 150 degrees, in the ultra-hydrophobic range. FIG. 4 is a schematic illustration of a test for measuring a contact angle between a water droplet and a coating according to the present invention. As depicted, the contact angle ($\alpha$) between water droplet 410 and coating 415 is approximately 150 degrees.

One of the main advantages of the fabrication methods of the present invention is their general applicability. Since the methods do not require modification of an already existing coating (i.e., substrate), they can be readily used in existing installations. This makes the methods particularly economically attractive to employ. One notable application is protection of metallic structures exposed to harsh marine environments from corrosion. Such metal structures can be coated initially using commercially-available epoxy paints including Hempadur 45070, Interseal 41/Interzone 954, Jotamastic 80/Penguard FC, Sigmacover 410 prime/Sigmacover 410, Carboguard 690, and Euronavy ES301. To this paint can be added a coating according to the present invention as described. The coating provides additional surface roughness sufficient to achieve high hydrophobicity while only minimally modifying the structure and the integrity of the underlying paint and substrate. Since the particles are added on the surface of the coating when the polymeric coating is still not completely cured, the particles are incorporated in proximity of the surface of the coating.

Further enhancements can be made to properties of the coating fabricated according to the present invention through use of additives. For example, hydrophobic ligands can be added to the silica particles. These ligands add an additional chemical hydrophobic barrier. The choices of the ligands can be diverse. For instance, fluorinated silane can be added to silica nanoparticles. The fluorinated chemical groups promote hydrophobicity and the silane groups can be bonded to the silica through silanization, as known in the art.

Figure 5:
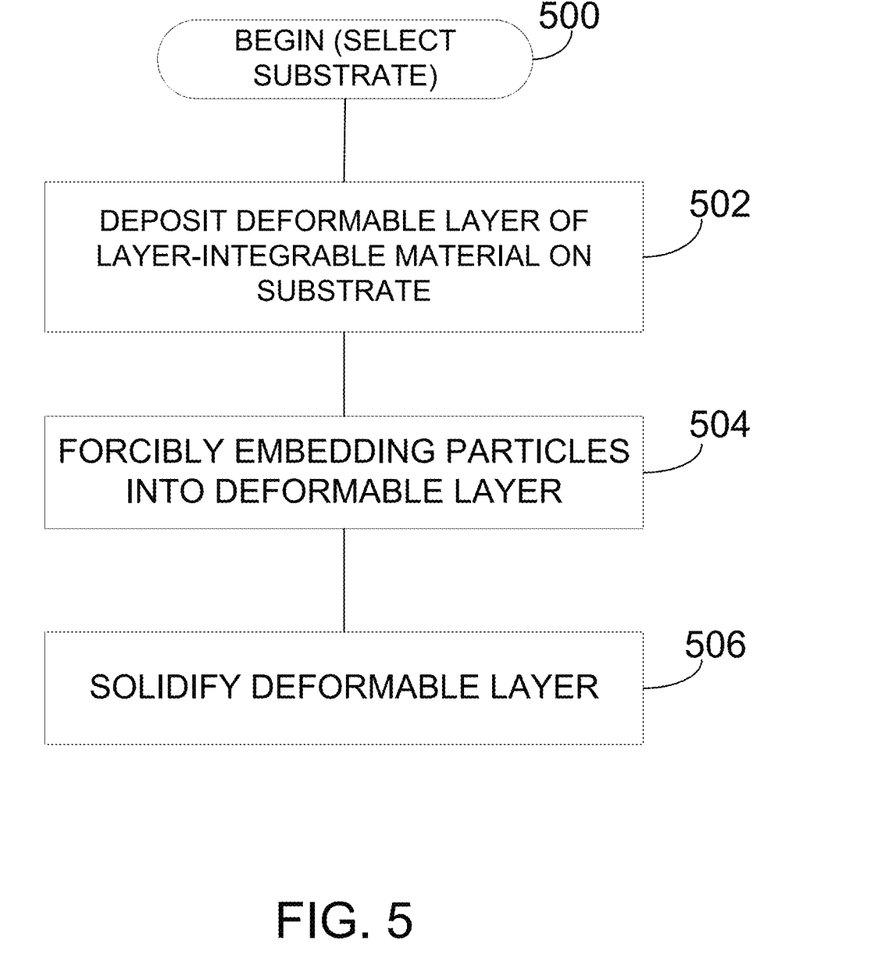
FIG. 5 is a flow chart of an embodiment of a method of fabricating a hydrophobic coating according to the present invention.

FIG. 5 is a flow chart of an embodiment of a method of fabricating a hydrophobic coating on a surface of a solid substrate including a layer-integrable material according to the present invention. In step 500 the method begins with selection of a substrate (or initial coating) including a layer-integrable material that is to be protected with an anti-corrosion coating. In step 502, a deformable viscous or semi-viscous layer of layer-integrable material is deposited onto the substrate. In step 504, particles are forcibly embedded (e.g., by bombardment) into the deformable layer at selected momenta and are embedded in the deformable layer at varying depths. In step 506, the deformable layer is solidified and is integrated seamlessly and continuously with the substrate.

Although the disclosed methods were described mainly with reference to epoxy coating and silica particles, other materials that are layer-integrable as defined above can be used. Such layer-integrable materials can include polymer resins such as polyurethanes, polysiloxanes, polyacrylates, polyethylene, polypropylene, polystyrene, etc. Additionally, alternative particle materials that can employed include zinc oxide, manganese oxide, calcium carbonate, carbon Nanotubes, graphene oxide, magnesium oxide, among other oxides or sulfides.

It is to be understood that any structural and functional details disclosed herein are not to be interpreted as limiting the systems and methods, but rather are provided as a representative embodiment and/or arrangement for teaching one skilled in the art one or more ways to implement the methods.

It should be understood that although much of the foregoing description has been directed to systems and methods for implanting photonic materials, methods disclosed herein can be similarly deployed other 'smart' structures in scenarios, situations, and settings beyond the referenced scenarios. It should be further understood that any such implementation and/or deployment is within the scope of the system and methods described herein.

It is to be further understood that like numerals in the drawings represent like elements through the several figures, and that not all components and/or steps described and illustrated with reference to the figures are required for all embodiments or arrangements The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing, and are not to be construed as limiting. However, it is recognized these terms could be used with reference to a viewer. Accordingly, no limitations are implied or to be inferred.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of fabricating a hydrophobic coating on a surface of a solid substrate which includes a layer-integrable material, the method comprising:
   depositing a deformable layer of the layer-integrable material onto the surface of the solid substrate;
   forcibly bombarding by pneumatically or electrostatically spraying a plurality of particles within the deformable layer, wherein at least a portion of the particles is at a depth below the surface of the deformable layer and others are at different depths so as to define a distribution of depths of particles to thereby provide a complex morphology in the deformable layer;
   solidifying the deformable layer including the plurality of particles so as to be integral with the surface of the solid substrate; and
   adjusting a viscosity of the deformable layer in tandem with particle bombardment parameters used in the bombarding step to be between about 1000 and about 500,000 cP to enable at least a portion of the particles to penetrate into the deformable layer with the distribution of depths while any particles of a nanometer-size among the portion of the particles only penetrate into the deformable material without penetrating through the substrate,
   whereby at least a portion of the plurality of particles is embedded at a threshold depth within the deformable layer in a range of one quarter of an average diameter of the plurality of particles to approximately 100 times the average diameter of the plurality of particles prior to solidification.

2. The method of claim 1, wherein the step of forcibly embedding a plurality of particles within the deformable layer includes bombarding the deformable layer with a stream of particles at selected momenta.

3. The method of claim 1, wherein the plurality of particles have a size in a range of about 1 nm to about 50 μm.

4. The method of claim 3, wherein the plurality of particles have a size in the range of about 5 nm to about 50 nm.

5. The method of claim 1, wherein the plurality of particles has a size distribution ranging between 1 and 50 percent from an average size value.

6. The method of claim 1, wherein the plurality of particles has a multimodal size distribution.

7. The method of claim 1, wherein the deformable layer is deposited in one of a fluid, semi-viscous or viscous form.

8. The method of claim 1, wherein the first material comprises an epoxy resin.

9. The method of claim 8, wherein the plurality of particles are composed of silica.

10. The method of claim 1, wherein upon solidification of the deformable layer, the plurality of particles have a hierarchical morphology such that a portion of the plurality of particles are exposed on a surface of the solidified deformable layer, and a portion of the plurality of particles are fully embedded with the solidified deformable layer.

* * * * *